(12) United States Patent
Cambron et al.

(10) Patent No.: US 8,805,993 B2
(45) Date of Patent: Aug. 12, 2014

(54) SYSTEM AND METHOD FOR BULK NETWORK DATA COLLECTION

(75) Inventors: Keith Cambron, San Antonio, TX (US); Baofeng Jiang, Pleasanton, CA (US); Xidong Wu, Livermore, CA (US); Jim Otsuka, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 985 days.

(21) Appl. No.: 11/292,591

(22) Filed: Dec. 2, 2005

(65) Prior Publication Data

US 2007/0130322 A1    Jun. 7, 2007

(51) Int. Cl.
*G06F 15/173*    (2006.01)

(52) U.S. Cl.
USPC .......................................... 709/224; 709/223

(58) Field of Classification Search
USPC .................................. 709/224, 223
See application file for complete search history.

(56) References Cited

U.S. PATENT DOCUMENTS

| | | | |
|---|---|---|---|
| 4,973,957 A * | 11/1990 | Shimizu et al. .......... 340/825.52 |
| 5,467,475 A * | 11/1995 | Takahashi et al. ......... 379/93.01 |
| 5,751,914 A * | 5/1998 | Coley et al. ...................... 706/47 |
| 5,751,933 A | 5/1998 | Dev et al. |
| 5,809,238 A * | 9/1998 | Greenblatt et al. ........... 709/202 |
| 6,085,251 A * | 7/2000 | Fabozzi, II ..................... 709/230 |
| 6,374,254 B1 * | 4/2002 | Cochran et al. ............... 707/102 |
| 6,546,420 B1 * | 4/2003 | Lemler et al. ................. 709/224 |
| 6,618,588 B1 * | 9/2003 | Easley .......................... 455/433 |
| 6,801,940 B1 | 10/2004 | Moran et al. |
| 6,944,673 B2 | 9/2005 | Malan et al. |
| 6,985,901 B1 * | 1/2006 | Sachse et al. ................... 707/10 |
| 7,020,701 B1 | 3/2006 | Gelvin et al. |
| 7,092,364 B1 * | 8/2006 | Franklin et al. ............... 370/252 |
| 2001/0049717 A1 * | 12/2001 | Freeman et al. ............... 709/203 |
| 2003/0214939 A1 * | 11/2003 | Eldumiati et al. ............. 370/352 |
| 2004/0199619 A1 * | 10/2004 | Jai et al. ......................... 709/223 |
| 2006/0007901 A1 * | 1/2006 | Roskowski et al. ........... 370/338 |
| 2006/0149765 A1 * | 7/2006 | Knoerle et al. ................ 707/101 |
| 2007/0097877 A1 * | 5/2007 | Hoekstra et al. .............. 370/252 |

* cited by examiner

*Primary Examiner* — Rupal Dharia
*Assistant Examiner* — Joe Chacko
(74) *Attorney, Agent, or Firm* — Jackson Walker L.L.P.

(57) ABSTRACT

A system and method for bulk data collection for multiple network elements is provided. The method includes initiating a session between a data collection server and a network server, maintaining a correlation between a plurality of queries and a corresponding plurality of network elements, and concurrently sending the plurality of queries over the initiated session to collect data from the network server.

14 Claims, 3 Drawing Sheets

SYSTEM AND METHOD FOR BULK NETWORK DATA COLLECTION

BACKGROUND OF THE DISCLOSURE

1. Field of the Disclosure

The present disclosure relates to communication networks that provide network services, such as digital subscriber line (DSL) services.

2. Background

Digital Subscriber Line services, such as Internet access, Internet Protocol Television (IPTV), Voice over Internet Protocol (VoIP), Video-on-Demand (VoD), etc. are provided by service providers utilizing a DSL network. A DSL network typically includes a large number of switches, such as Digital Subscriber Line Access Multiplexers DSLAMs), each such switch having multiple ports. Each port provides a dedicated connection to separate customer interface equipment. A typical switch includes multiple ports often 100-2000 ports. A DSL network typically provides DSL services to several million customers spread over different regions, thus utilizing several thousand switches. Often, the DSL network is divided into sub-networks or regional networks, each such regional network being within a firewall. Typically, several data management servers, referred to as EMS servers, are placed in each regional network to retrieve data (such as inventory data, performance data, etc.) data from the switches in their corresponding regions in response to queries from one or more data collection servers.

The EMS servers typically limit the number of concurrent data query sessions ("sessions") for data collection purposes. Thus, for example, if the number of concurrent sessions is limited to ten and there are 500 switches associated with an EMS server, then each session would process 50 switches sequentially when the servers operate in a synchronous mode. Data collection from each switch can take several minutes to a few hours. Thus, such a data collection method can take a substantial amount of time. The problem can be mitigated by adding additional EMS servers, which can be costly and add to the additional burden of managing additional equipment. Thus, there is a need for an efficient bulk data collection system and method.

BRIEF DESCRIPTION OF THE DRAWINGS

For detailed understanding of the present invention, references should be made of the following detailed description of an exemplary embodiment, taken in conjunction with the accompanying drawings, in which like elements have been given like numerals, wherein.

DETAILED DESCRIPTION OF THE DISCLOSURE

This disclosure provides a system and method for bulk data collection relating to network elements, such as switches in a communication network, such as a DSL network. The system included a data collection server and at least one network server, wherein a certain number of concurrent sessions are available for the collection of data from the network server.

In one aspect, the system provides a method that: initiates data collection sessions a ("session") between the data collection server and the network server; generates multiple queries, each query corresponding to a network element; maintains a correlation between each query and the corresponding switch; and sends the multiple queries to the network server concurrently over the initiated session. In another aspect, the system generates a set of target files, each target file containing a list of multiple unique network element identifiers. In another aspect, the method selects a query for one network element from each of the target files and concurrently sends or launches all of the selected queries from the selected set over the same session. If multiple sessions are initiated, the method provides for sending a separate set of multiple queries over each of the initiated sessions.

In another aspect, the disclosure provides a computer-readable medium that is accessible to a processor. A computer program embedded within the computer-readable medium includes a set of instructions or routines, including: an instruction to initiate a session between a data collection server and a network server; an instruction to generate a plurality of queries, each query corresponding to a selected network element; an instruction to maintain a correlation between the query and the corresponding network element; an instruction to send concurrently the plurality of the queries to the network server to collect data relating to the network elements.

For the purpose of this disclosure the term query means a signal or data stream generated to obtain data or information from a server relating to a network element. The server may be a data management server, such as an EMS server, that retrieves data from the network elements, such as switches, also referred to as DSLAMs. The term session means a channel between two servers that can be utilized to transfer data between the servers. The term instruction means a computer program, module, routine, interface or one or more instructions for execution by a computer or a processor.

Figure 1:
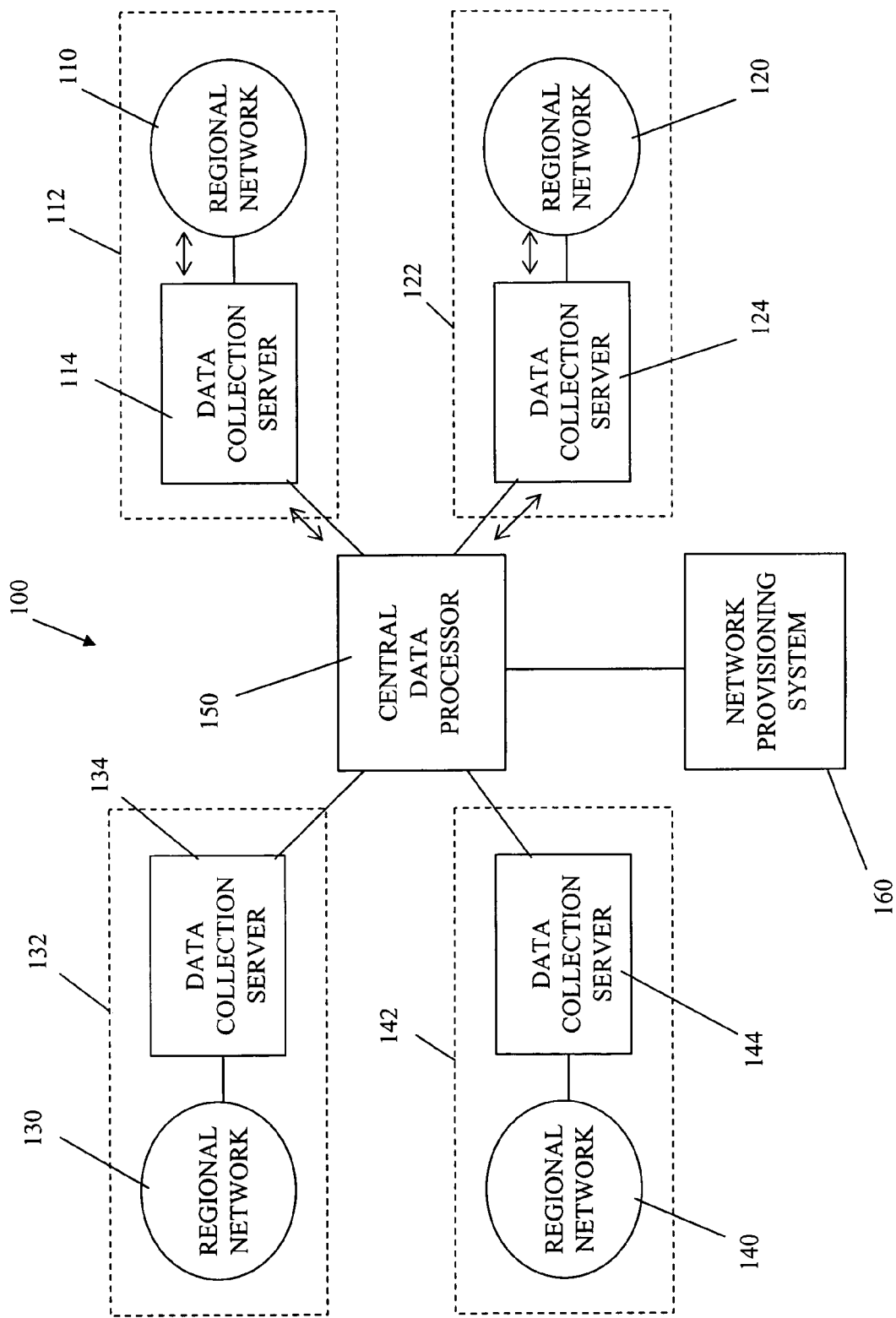
FIG. 1 is block diagram of an exemplary data collection system according to an embodiment of the present disclosure.

FIG. 1 shows a block diagram of an exemplary data collection system, for the collection of data relating to the provision of network services, such as DSL services that include Internet access, IPTV, VoD, VoIP, etc. according to one embodiment of the present disclosure. In the system 100, the overall network is shown divided into a number of regional networks, such as regional networks 110, 120, 130 and 140. The network elements, such as switches, routers and servers in each regional network may be placed within a corresponding firewall, such as firewalls 112, 122, 132, and 142. The system 100 is shown to contain a data collection server within the firewall of each regional network. For example, data collection servers 114, 124, 134 and 144 are respectively shown placed within the fire walls 112, 122, 132 and 142. Each data collection server is connected to one or more data management servers, referred to in the industry as the EMS or AMS servers, within its associated regional network, as shown and described in more detail with respect to FIG. 2. Each EMS server in turn is connected to multiple switches, each switch having multiple ports.

The system 100 includes a central data processing center or central processor 150 and an associated network provisioning system 160. The central processor includes servers, displays, and associated memory. Each EMS server is connected to multiple switches in its associated regional network, each such switch having multiple ports. Each port connects to a customer interface for the provision of network services, such as Internet access, IPTV, VoIP, VoD, etc. The network provisioning system 160 includes a database that contains a list of the switches in the system, each switch having a unique identifier. The central processor 150 may be provided with the switch list or it may obtain the switch list by auto-query of the communication network. The central processor 150 communicates with each regional data collection server (114, 124, 134, 144), provides the switch list information to each of the data collection servers for the switches associated with such servers, obtains the data collected by the data collection servers, aggregates and stores the collected data corresponding to each switch identifier in a network database.

Figure 2:
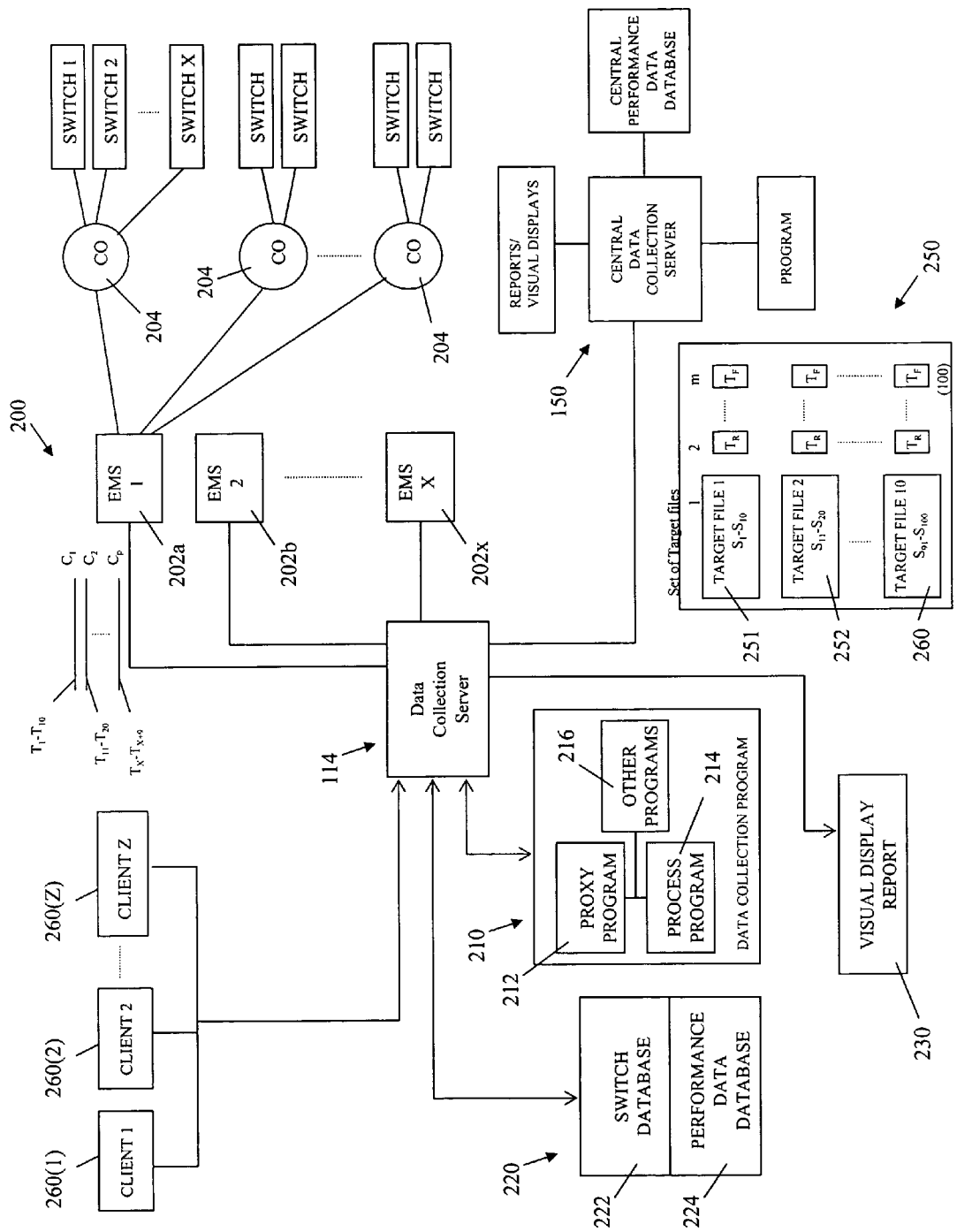
FIG. 2 is a block diagram showing certain details of the data collection system of a regional network of the system of FIG. 1.

The central processor 150, in one aspect, also generates targets files, each target file containing a selected number of switch identifiers and distributes the target files to the regional data collection servers for use in the collection of data, which is more fully described with respect to FIG. 2. In the system 100, the regional data collection servers collect the data and transfer the collected data to the central processor 150 for storage, for analyzing the data for the management of the network 100 and for generating and displaying the desired reports.

The collected data may be any desired data that relates to the various network elements, including performance data, inventory data, etc. The analysis may include bandwidth utilization, traffic monitoring, and determination of deployment of additional network resources, including the switches. It will be obvious that the network of system 100, however, may contain just one network or any number of regional networks.

FIG. 2 is a block diagram of an exemplary data collection system 200 that collects data from one of the regional networks, such as the regional network 110 of FIG. 1. The system 200 includes the data collection server 114 that is connected to EMS servers 202a through 202x in the regional network 110. Each of these EMS servers is connected to a number of switches. As an example, the EMS server 202a is shown connected to multiple switches, designated as $S_1$-$S_R$, located in several central offices 204. Similarly, each of the other EMS servers, $EMS_2$-$EMS_X$, is connected to multiple switches through other central offices (not shown).

In a large network, such as shown in FIGS. 1 and 2, there may be several hundred (e.g., 500-1000) switches connected to each EMS server. In the present example "r" represents the number of switches connected to the $EMS_1$ server. The data collection server 114 has access to several computer programs, including a data collection program 210. The data collection program 210 includes a proxy program 212, a process program 214 and other programs 216. The data collection server 114 further has access to a switch database 222 that may be resident at the central data processor 160 (FIG. 1) and provided to the data collection server by the central processor according to programmed instructions. The switch data may also be stored in a memory associated with the data collection server 114. The data collection server 114 and/or the central processor 150 further has an associated performance database 224 that has a file for each of the switches associated with the data collection server. A graphical user interface (GUI) 230 connected to the data collection server 114 and/or central processor 150 is used to display the analysis done on the collected data and the desired reports. The collection servers and EMS servers may communicate in synchronous or asynchronous modem.

Each EMS server typically has a limited number of available concurrent sessions for the collection of data from the switches associated with the EMS server. Such a limitation may be imposed due to the number of licenses available from the server manufacturer and/or by the service provider, because the EMS server also is used for other network management functions. Typically, there are 10-15 available concurrent sessions for each EMS server. The number of available servers may be different for different servers. FIG. 2 shows "p" available concurrent sessions, designated as $C_1$-$C_p$ for the $EMS_1$ server, where p is a whole number.

As an example, and not as a limitation, assume that there are 1000 (r=1000) switches connected to the $EMS_1$ server 114 and that there are 10 available concurrent sessions (c=10). In a typical synchronous mode system, the data collection system would send to the $EMS_1$ server one query (such as TL1, SNMP, etc.) corresponding to a particular switch over each session and wait for the response from the $EMS_1$ server and then send a second query after receiving all the information for that switch, and so on until all the queries have been sent. Thus, in this example, there will be ten queries being processed by the $EMS_1$ server concurrently, one over each available session, thus requiring 100 launches to obtain data from all of the 1000 switches connected to the EMS1 server. The $EMS_1$ server then will collect the data for each port of the selected switch and send the collected data to the data collection server 114. The response time of each such data query to a switch can typically range from one second to a minute per port, depending upon the amount of the data available or requested for the selected switch. Often, several such queries are needed to acquire all of the data from a single port in the switch. Since there may be several thousand ports for which an EMS server may collect the data, it may take a few hours to collect all the data from each switch.

In the present system 200, however, the process program 214 generates multiple queries or a set of queries, each query having a unique identifier for a particular switch. The proxy program 212 then generates a proxy session that enables the server 116 to send all of the queries in the set of queries concurrently to the network server over a particular session. Thus, for example, if there are 10 queries or commands (such as TL1, SNMP, etc.) generated in a set, each such command for a separate switch, the proxy process would launch 10 concurrent queries over the same session. In this manner 100 queries can be sent concurrently over the 10 available concurrent sessions, thereby requiring a total of ten cycles per session to collect the data from all 100 switches. Thus, the data collection server 114 of the system 200 sends more queries concurrently than the number of available sessions. It should be noted that the number of concurrent queries sent may be different for different sessions for the same EMS server. The proxy program 212 maintains the correlation between each query and the corresponding switch identifier. The data collection server 114 receives the data from the $EMS_1$ server 202a for a particular switch, correlates the received data to that switch and the ports associated with the switch. The data collection server 114 then forwards the correlated data to the database 220 and/or to the central processor 150 (FIG. 1). The collected data for each switch may be stored in a separate data file and further subdivided by the data for each port associated with that switch.

Still referring to FIG. 1, in another aspect, the data collection server 114 may multiplex the set of queries or proxy processes among the available sessions for an EMS server. Once the data for a particular set of queries over a particular session has been received, the data collection server launches another set of queries or a proxy process over that session, concurrently sending multiple queries.

The present disclosure, in another aspect, provides load balancing of the EMS servers. In one aspect, the load balancing may be done by creating "target" files as described below with respect to the $EMS_1$ server 202a (FIG. 2). The central processor 150 (FIG. 1) or the regional data collection server 114 (FIG. 2) creates target files corresponding to each EMS server, such as EMS 202a. Each target file contains multiple switch identifiers. The use of the target files is described by way of an example below. Assuming that the EMS server has 10 available sessions and collects data from 1000 switches. In one aspect, 100 target files may be generated, each containing 10 switch identifiers, thus creating 100 target files for the 1000 switches. The 100 target files may be divided into 10 sets, each contains 10 target files. The system 200 shows target file sets 250, wherein the first target file 251 contains identifiers for switches designated as $S_1$-$S_{10}$, the second file 252 contains identifiers for switches designated as $S_{11}$-$S_{20}$ and so on and the last or the $10^{th}$ target file 260 containing identifiers for switches 91-100. Similarly the sets 2-10, each contains ten target files, each such target file containing ten distinct switch identifiers.

In this example, the process program generates queries for one switch from each target file $T_1$-$T_{10}$. The proxy program then initiates a process or a proxy process that sends the ten switch queries concurrently to the $EMS_1$ server 202a over a session selected from one of the 10 available sessions. Similarly, the data collection server 114 launches a proxy process over each of the other nine available sessions, each sending 10 concurrent queries. Such a method tends to load balance the queries over the available sessions for the EMS server. It should be noted that the target files may contain a different number of switches or switch identifiers and a different number of concurrent queries may be sent on different available sessions. Often, different EMS servers in the same regional network collect data from a different number of switches containing a different number of ports. The present disclosure thus provides a flexible system of load balancing that can be adjusted to the network environment.

All of the collected data, in one aspect, is sent to the central processor 150, where it is stored in a central database associated with the network provisioning system 160. Each switch data may be stored in a separate file corresponding to each port associated with that switch. The collected data is analyzed on a regional basis and/or on the network-wide basis. The reports using one or more business criteria are created and may be displayed on display devices associated with the central processor 150 and the regional data collection servers 114, 124, 134, and 144.

As noted earlier, the switch list for the entire network may be provided to the network provisioning system 160, or the central processor 150 may obtain the switch list by auto-query of the network. Multiple concurrent queries for collecting data relating to multiple network elements are concurrently sent over each available session. The queries may be multiplexed and load balanced over the available sessions. The network elements, such as switches, may be divided into small sets or groups and each set assigned to a separate target file. The number of target files, in one aspect, may be no more than the maximum number of concurrent processes which a data collection server supports. All switches in the same target file are associated with the same EMS server. Switches may be substantially evenly distributed among the various target files assigned to a particular EMS server. For a network that has multiple regional data collection servers, data files are distributed to each regional data collection server from a central data processor. The collected data for the entire network is transferred to a central processor, where it is aggregated, filtered and stored.

The present disclosure thus provides a system and method where bulk data collection may be done efficiently. The collected data is analyzed to generate reports for use in managing the network. The reports may be displayed for viewing by any suitable display device. Locating the regional data collection servers at the same place as the EMS servers may reduce the network traffic (such as due to the input/output connections). The placement of the data collection servers within the firewalls associated with the EMS servers also may reduce data security concerns.

Still referring to FIG. 2, in another aspect, queries may be sent by customers 200(1)-260(z) to the data collection server 114 directly or via the central processor 150. A customer is typically a call center person attempting to determine a problem relating to a port for a particular switch. Often, multiple such requests are made to the same EMS server. In this situation, the data collection server is configured to send multiple queries concurrently to the EMS server over one or more initiated sessions. This enables faster real-time responses to customer queries. The received data is analyzed and stored as described earlier.

Figure 3:
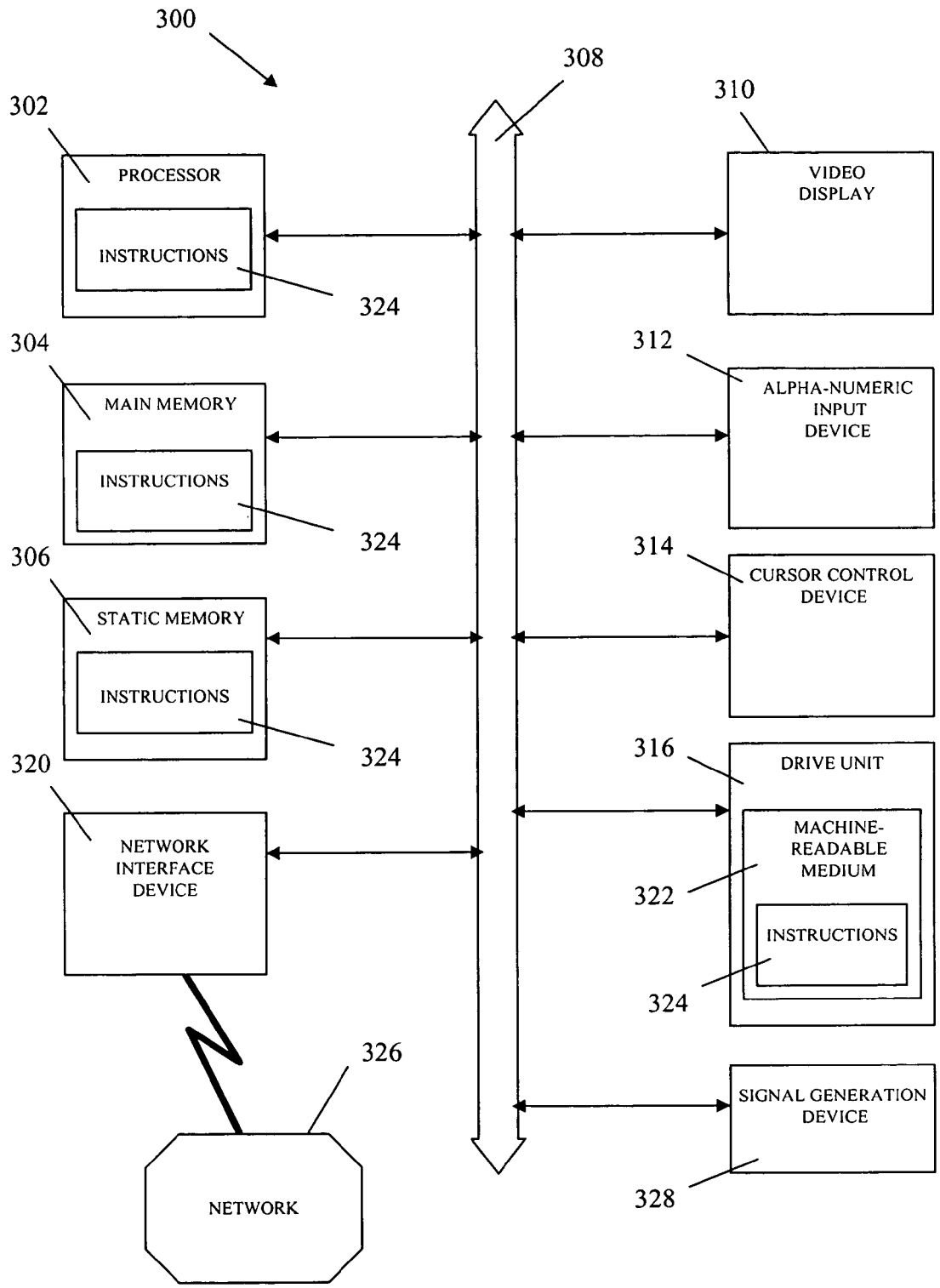
FIG. 3 is a diagrammatic representation of a machine in the form of a computer system within which a set of instructions, when executed, may cause the machine to perform any one or more of the methodologies of the present disclosure.

FIG. 3 is a diagrammatic representation of a machine in the form of a computer system within which a set of instructions, when executed, may cause the machine to perform any one or more of the methodologies of the present disclosure. Turning now to FIG. 3, FIG. 3 is a diagrammatic representation of a machine in the form of a computer system 300 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU), or both), a main memory 704 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated in herein above. The instructions 324 may also reside, completely or at least partially, within the main memory 304, the static memory 306, and/or within the processor 302 during execution thereof by the computer system 300. The main memory 304 and the processor 302 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more machine-readable medium listed herein and including art-recognized equivalents and successor media, in which the software implementations herein are stored.

What is claimed is:

1. A data collection server comprising:
   a processor;
   a database available to the processor, for storing a plurality of identifiers relating to a plurality of network elements;
   a computer readable storage medium including processor executable instructions that, when executed by the processor, cause the processor to perform operations including:
   accessing a plurality of target files, each of the plurality of target files identifying a corresponding group of network elements associated with a data management server wherein the plurality of target files collectively identify all network elements associated with the data management server;
   initiating, by a data collection server, a plurality of concurrent sessions with the data management server;
   generating, for each of the concurrent sessions, a plurality of queries, wherein each query is associated with a network element from the group of network elements identified in the corresponding target file;
   concurrently sending each of the plurality of queries to the data management server over a corresponding one of the plurality of concurrent sessions, the plurality of concurrent sessions includes initiating a session for each of the plurality of target files; and
   responsive to receiving data corresponding to each network element from the data management server, storing the data in a data file organized according to a port list.

2. The data collection server of claim 1, wherein the operations include:
   correlating data received from the data management server to a corresponding network element based on an identifier included in a corresponding query.

3. The data collection server of claim 2, wherein the operations include:
   generating a performance report from the received data relating to each of the plurality of network elements.

4. A non-transitory computer readable storage medium including processor-executable instructions that, when executed by a processor, perform operations comprising:
   accessing a plurality of target files, each of the plurality of target files identifying a corresponding group of network elements associated with a data management server, wherein the plurality of target files collectively identify all network elements associated with the data management server;
   initiating, by a data collection server, a plurality of concurrent sessions with the data management server;
   generating, for each of the concurrent sessions, a plurality of queries, wherein each query is associated with a network element from the group of network elements identified in the corresponding target file;
   concurrently sending each of the plurality of queries to the data management server over a corresponding one of the plurality of concurrent sessions, the plurality of concurrent sessions includes initiating a session for each of the plurality of target files; and
   responsive to receiving data corresponding to each network element from the data management server, storing the data in a data file organized according to a port list.

5. The non-transitory computer readable medium of claim 4, wherein:
   the number of target files equals a maximum number of available sessions permitted by the data management server.

6. A method for data collection in a communication network, the method comprising:
   accessing a plurality of target files, each of the plurality of target files identifying a corresponding group of network elements associated with a data management server, wherein the plurality of target files collectively identify all network elements associated with the data management server;
   initiating, by a data collection server, a plurality of concurrent sessions with the data management server;
   generating, for each of the concurrent sessions, a plurality of queries, wherein each query is associated with a network element from the group of network elements identified in the corresponding target file;

concurrently sending each of the plurality of queries to the data management server over a corresponding one of the plurality of concurrent sessions, the plurality of concurrent sessions includes initiating a session for each of the plurality of target files; and responsive to receiving data corresponding to each network element from the data management server, storing the data in a data file organized according to a port list.

7. The method of claim 6, wherein the data collection server and data management server communicate within a common firewall.

8. The non-transitory computer readable storage medium of claim 4, wherein the operations include:
multiplexing the queries among the plurality of concurrent sessions.

9. The non-transitory computer readable storage medium of claim 4, wherein:
each of the target files is associated with a substantially equal number of network elements.

10. The non-transitory computer readable storage medium of claim 4, wherein:
the data collection server comprises a regional data collection server associated with a regional network covering a region and wherein the network elements comprise network elements within the region.

11. The non-transitory computer readable storage medium of claim 10, wherein:
a plurality of data management servers is associated with the data collection server wherein each data management server is associated with a central office of the regional network.

12. The non-transitory computer readable storage medium of claim 11, wherein the operations include:
load balancing each of the plurality of concurrent sessions by assigning approximately equal numbers of queries to each of the plurality of concurrent sessions.

13. The non-transitory computer readable storage medium of claim 4, wherein the operations include:
correlating data received from each query to the network element corresponding the query.

14. The method of claim 6, wherein each network element is a switch that provides a DSL service to a plurality of customers and wherein each query identifies a corresponding switch.

* * * * *

UNITED STATES PATENT AND TRADEMARK OFFICE
CERTIFICATE OF CORRECTION

| | | |
|---|---|---|
| PATENT NO. | : 8,805,993 B2 | Page 1 of 4 |
| APPLICATION NO. | : 11/292591 | |
| DATED | : August 12, 2014 | |
| INVENTOR(S) | : Keith Cambron et al. | |

It is certified that error appears in the above-identified patent and that said Letters Patent is hereby corrected as shown below:

In the Claims

Column 7, line 54 thru Column 10, line 21

Replace all claims as follows:

1. A data collection server comprising:

a processor;

a database available to the processor, for storing a plurality of identifiers relating to a plurality of network elements;

a computer readable storage medium including processor executable instructions that, when executed by the processor, cause the processor to perform operations including:

accessing a plurality of target files, each of the plurality of target files identifying a corresponding group of network elements associated with a data management server wherein the plurality of target files collectively identify all network elements associated with the data management server;

initiating, by a data collection server, a plurality of concurrent sessions with the data management server;

generating, for each of the concurrent sessions, a plurality of queries, wherein each query is associated with a network element from the group of network elements identified in the corresponding target file;

concurrently sending each of the plurality of queries to the data management server over a corresponding one of the plurality of concurrent sessions, the plurality of concurrent sessions includes Signed and Sealed this
Eighteenth Day of November, 2014

Michelle K. Lee
*Deputy Director of the United States Patent and Trademark Office*

Cont'd.

initiating a session for each of the plurality of target files; and responsive to receiving data corresponding to each network element from the data management server, storing the data in a data file organized according to a port list.

2. The data collection server of claim 1, wherein the operations include:

correlating data received from the data management server to a corresponding network element based on an identifier included in a corresponding query.

3. The data collection server of claim 2, wherein the operations include:

generating a performance report from the received data relating to each of the plurality of network elements.

4. A non-transitory computer readable storage medium including processor-executable instructions that, when executed by a processor, perform operations comprising:

accessing a plurality of target files, each of the plurality of target files identifying a corresponding group of network elements associated with a data management server, wherein the plurality of target files collectively identify all network elements associated with the data management server;

initiating, by a data collection server, a plurality of concurrent sessions with the data management server;

generating, for each of the concurrent sessions, a plurality of queries, wherein each query is associated with a network element from the group of network elements identified in the corresponding target file;

concurrently sending each of the plurality of queries to the data management server over a corresponding one of the plurality of concurrent sessions, the plurality of concurrent sessions includes initiating a session for each of the plurality of target files; and responsive to receiving data corresponding to each network element from the data management server, storing the data in a data file organized according to a port list.

5. The non-transitory computer readable medium of claim 4, wherein:

the number of target files equals a maximum number of available sessions permitted by the data management server.

Cont'd.

[[8]] 6. The non-transitory computer readable storage medium of claim 4, wherein the operations include:

multiplexing the queries among the plurality of concurrent sessions.

[[9]] 7. The non-transitory computer readable storage medium of claim 4, wherein:

each of the target files is associated with a substantially equal number of network elements.

[[10]] 8. The non-transitory computer readable storage medium of claim 4, wherein:

the data collection server comprises a regional data collection server associated with a regional network covering a region and wherein the network elements comprise network elements within the region.

[[11]] 9. The non-transitory computer readable storage medium of claim [[10]] 8, wherein:

a plurality of data management servers is associated with the data collection server wherein each data management server is associated with a central office of the regional network.

[[12]] 10. The non-transitory computer readable storage medium of claim [[11]] 9, wherein the operations include:

load balancing each of the plurality of concurrent sessions by assigning approximately equal numbers of queries to each of the plurality of concurrent sessions.

[[13]] 11. The non-transitory computer readable storage medium of claim 4, wherein the operations include:

correlating data received from each query to the network element corresponding the query.

[[6]] 12. A method for data collection in a communication network, the method comprising:

accessing a plurality of target files, each of the plurality of target files identifying a corresponding group of network elements associated with a data management server, wherein the plurality of target files collectively identify all network elements associated with the data management server;

initiating, by a data collection server, a plurality of concurrent sessions with the data management server;

generating, for each of the concurrent sessions, a plurality of queries, wherein each query is associated with a network element from the group of network elements identified in the corresponding Cont'd.

target file;

concurrently sending each of the plurality of queries to the data management server over a corresponding one of the plurality of concurrent sessions, the plurality of concurrent sessions includes initiating a session for each of the plurality of target files; and responsive to receiving data corresponding to each network element from the data management server, storing the data in a data file organized according to a port list.

[[14]] 13. The method of claim [[6]] 12, wherein each network element is a switch that provides a DSL service to a plurality of customers and wherein each query identifies a corresponding switch.

[[7]] 14. The method of claim [[6]] 12, wherein the data collection server and data management server communicate within a common firewall.